(12) United States Patent
Lin

(10) Patent No.: US 11,075,664 B2
(45) Date of Patent: Jul. 27, 2021

(54) MOBILE PHONE HOLDER WITH SLIDING OPENING

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 0 days.

(21) Appl. No.: 16/935,193

(22) Filed: Jul. 22, 2020

(65) Prior Publication Data

US 2021/0028807 A1 Jan. 28, 2021

(30) Foreign Application Priority Data

Jul. 22, 2019 (CN) .......................... 201921144325.1

(51) Int. Cl.
| | |
|---|---|
| *H04M 1/00* | (2006.01) |
| *H04B 1/3888* | (2015.01) |
| *H04M 1/06* | (2006.01) |
| *H04B 1/3877* | (2015.01) |

(52) U.S. Cl.
CPC ......... *H04B 1/3888* (2013.01); *H04B 1/3877* (2013.01); *H04M 1/06* (2013.01)

(58) Field of Classification Search
CPC ........ H04M 1/04; H04M 1/06; H04M 1/6083; H04B 1/3877; H04B 1/3888
See application file for complete search history.

(56) References Cited

U.S. PATENT DOCUMENTS

| | | | |
|---|---|---|---|
| 9,573,532 B2* | 2/2017 | Riddiford | ................. F16B 2/12 |
| 10,253,926 B1* | 4/2019 | Fan | ......... F16M 11/14 |
| 10,492,322 B1* | 11/2019 | Fan | ........................ F16B 2/12 |
| 10,598,199 B1* | 3/2020 | Fan | ......................... B60R 11/02 |
| 10,663,104 B2* | 5/2020 | Yang | .................... F16M 13/022 |

* cited by examiner

*Primary Examiner* — Nhan T Le
(74) *Attorney, Agent, or Firm* — Lin & Associates Intellectual Property, Inc.

(57) ABSTRACT

A mobile phone holder includes: a first coupling part having a first accommodating portion, a first clamping portion and a first pressing portion; a second coupling part having a second accommodating portion, a second clamping portion, a second pressing portion, and a sliding opening; and an extension spring. The first pressing portion penetrates into the second accommodating portion and penetrates out through the sliding opening. A clamping space is formed by the first and second clamping portions. A pressing space is formed by the first and second pressing portions. Both ends of the extension spring are fixed at the first and second accommodating portions. The first and second pressing portions are pressed toward each other such that the pressing space decreases and the clamping space increases. The first and second pressing portions are released, thereby due to a tensile force, the pressing space increases and the clamping space decreases.

6 Claims, 23 Drawing Sheets

MOBILE PHONE HOLDER WITH SLIDING OPENING

CROSS-REFERENCE TO RELATED APPLICATION

This application claims the priority of Chinese patent application No. CN 201921144325.1, filed on Jul. 22, 2019, which is incorporated herewith by reference.

BACKGROUND OF THE INVENTION

1. Field of the Invention

The present invention relates to a mobile phone holder, and more particularly, to a mobile phone holder with a sliding opening.

2. The Prior Arts

A conventional mobile phone holder has a left member and a right member. Both ends of the left member are respectively a left clamping portion and a left pressing portion, and both ends of the right member are respectively a right clamping portion and a right pressing portion. A left connecting portion and a right connecting portion are disposed at middle predetermined positions of the left member and the right member, respectively. The left connecting portion and the right connecting portion are docked and coupled together by a screw-fixing member. The screw-fixing member is provided with an elastic member. With the screw-fixing member as a shaft, the elastic member spreads the left pressing portion and the right pressing portion, and the left clamping portion and the right clamping portion are close to each other. The left pressing portion and the right pressing portion are pressed toward each other simultaneously such that the left clamping portion and the right clamping portion are separated from each other. A mobile phone is placed between the left clamping portion and the right clamping portion, and then the left pressing portion and the right pressing portion are released simultaneously, thereby the left clamping portion and the right clamping portion are close to each other to hold the mobile phone due to the action of the elastic member. This type of mobile phone holder has the disadvantages that it has large volume and is not easy to be carried, and the screw-fixing member has a risk of falling off after multiple uses, thereby causing the mobile phone holder not to be work.

Another type of conventional mobile phone holder has two L-members, which are an upper L-member and a lower L-member, respectively. Their lateral portions are an upper clamping portion and a lower clamping portion, respectively. Their longitudinal portions are an upper coupling portion and a lower coupling portion, respectively. The upper coupling portion and the lower coupling portion are coupled with each other into a C-shaped mobile phone holder. A compression spring is disposed between the upper coupling portion and the lower coupling portion. When in use, a side of the mobile phone is placed at the lower clamping portion, the upper clamping portion is pulled to be opened and the other side of the mobile phone is placed therein, and then the upper clamping portion is released, such that the upper clamping portion and the lower clamping portion are close to each other to hold the mobile phone. This type of mobile phone holder has disadvantages that during operation, the upper clamping portion and the lower clamping portion need to be operated with both hands, which is inconvenient for operation, and the careless operation will cause the falling and thus damage of the mobile phone.

SUMMARY OF THE INVENTION

In order to overcome the disadvantages of large volume, inconvenient carrying, inconvenient operation, and falling risk of the mobile phone for the existing mobile phone holders, the present invention provides a mobile phone holder with a sliding opening, which has a first coupling part and a second coupling part. A first clamping portion and a first pressing portion are respectively disposed at predetermined positions of both ends of the first coupling part. A second clamping portion and a second pressing portion are respectively disposed at predetermined positions of both ends of the second coupling part. The first coupling part and the second coupling part are coupled with each other and connected to both ends of an extension spring, respectively. The first pressing portion and the second pressing portion are pressed toward each other simultaneously such that the first clamping portion and the second clamping portion are separated from each other, and thus the clamping space becomes larger. A mobile phone is placed into the clamping space, then the first pressing portion and the second pressing portion are released simultaneously, such that due to a tensile force of the extension spring, the first clamping portion and the second clamping portion are close to each other and thus the clamping space reduces, thereby the mobile phone is held by and the mobile phone holder. The mobile phone holder according to the present invention has a reduced volume, is convenient for the user's operation, and can avoid the falling risk of the mobile phone. The present invention can be applied not only to hold mobile phones but also to hold thin objects not limited to the mobile phones, such as tablet computers.

The technical solution adopted by the present invention to solve the technical problems is to provide a mobile phone holder with a sliding opening for holding a mobile phone, comprising: a first coupling part, a second coupling part, and an extension spring. Both ends of the first coupling part are a first acting end and a first operating end, respectively; a first accommodating portion is disposed in the first coupling part; the first accommodating portion is provided with a first operating end opening at the first operating end; a first clamping portion and a first pressing portion are disposed on different outer sides of the first coupling part, respectively; the first clamping portion is disposed at a predetermined position of the first acting end, and the first pressing portion is disposed at a predetermined position of the first operating end. Both ends of the second coupling part are a second acting end and a second operating end, respectively; a second accommodating portion is disposed in the second coupling part; the second accommodating portion is provided with a second operating end opening at the second operating end; a second clamping portion and a second pressing portion are disposed on different outer sides of the second coupling part, respectively; the second clamping portion is disposed at a predetermined position of the second acting end, and the second pressing portion is disposed at a predetermined position of the second operating end, wherein the second coupling part is provided with a sliding opening, the sliding opening is positioned at a same side as the second pressing portion and communicated with the second accommodating portion. The first pressing portion of the first operating end penetrates into the second accommodating portion through the second operating end opening and penetrates out of the second accommodating portion through the sliding opening, such that the first clamping portion and the second clamping portion face toward a same direction and correspond to each other, and the first pressing portion and the second pressing portion face toward another same direction and correspond to each other, thereby a clamping space is formed between the first clamping portion and the second clamping portion, and a pressing space is formed between the first pressing portion and the second pressing portion. Both ends of the extension spring are respectively fixed at predetermined positions of the first accommodating portion and the second accommodating portion such that a width of the clamping space is minimum, and a width of the pressing space is maximum. The first pressing portion and the second pressing portion are pressed toward each other simultaneously such that the first operating end and the first pressing portion of the first coupling part slide at the second accommodating portion and the sliding opening, respectively, thereby the width of the pressing space decreases and the width of the clamping space increases. A mobile phone is placed into the clamping space, then the first pressing portion and the second pressing portion are released simultaneously, thereby due to a tensile force action of the extension spring, the width of the pressing space increases and the width of the clamping space correspondingly decreases such that the first clamping portion and the second clamping portion hold the mobile phone.

Preferably, a first fastener is disposed at a predetermined position on an outer side of the first pressing portion.

Preferably, a second fastener is disposed at a predetermined position on an outer side of the second clamping portion.

Preferably, at least one longitudinal stabilizing groove is disposed at a predetermined position outside the first coupling part, and at least one longitudinal stabilizing flange is disposed in the second accommodating portion at a position corresponding to the longitudinal stabilizing groove. The first operating end penetrates into the second accommodating portion through the second operating end opening such that the longitudinal stabilizing groove and the longitudinal stabilizing flange are engaged with each other, thereby the longitudinal stabilizing flange may be longitudinally slidable in the longitudinal stabilizing groove.

Preferably, a back U-groove is disposed at the second acting end in the second accommodating portion, and the back U-groove is longitudinally disposed around the extension spring.

Preferably, a protruding plane is disposed at a predetermined position near the first operating end on a plane where the first pressing portion of the first coupling part is positioned.

The mobile phone holder according to the present invention has pressing portions and has the beneficial effects of small volume, avoiding the falling risk of the mobile phone during holding, convenient carrying and easy operation. The present invention can also be applied to hold tablet computers or thin rectangular equipment or objects.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Hereinafter, various embodiments of the present invention will be described according to FIGS. 1A to 10. This description is not intended to limit the embodiments of the present invention, but is one of the embodiments of the present invention.

Figure 1A:
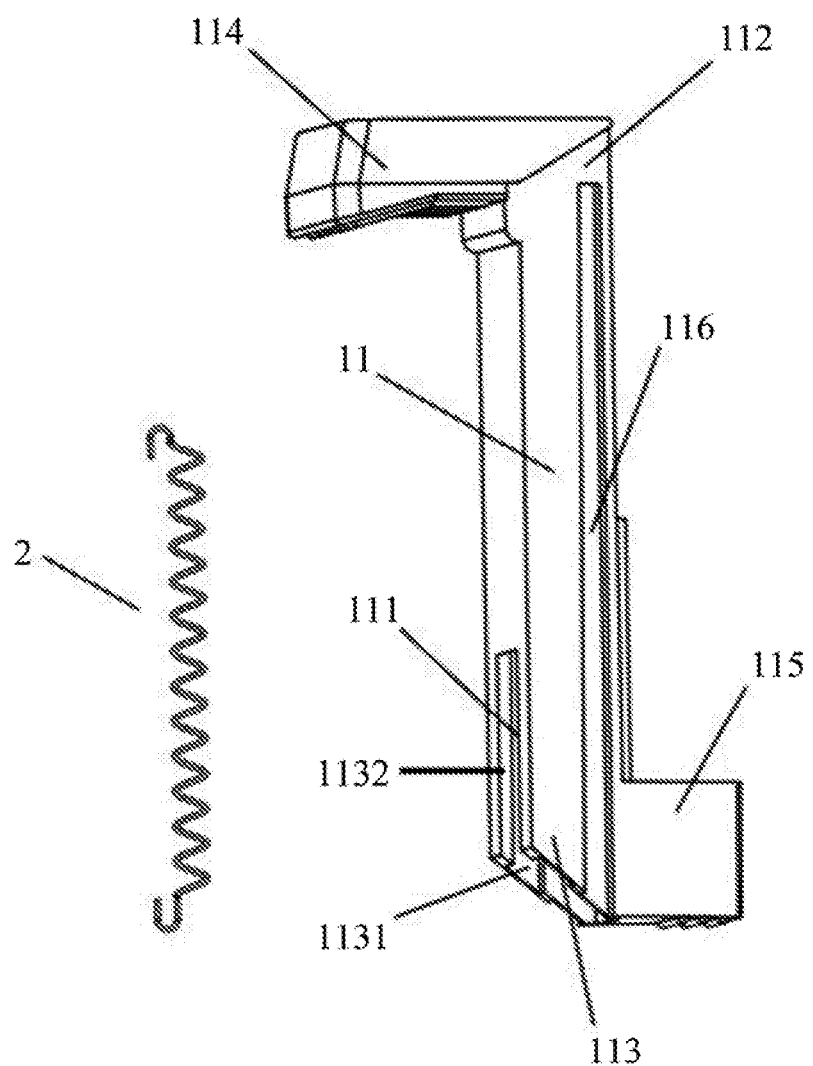
FIG. 1A is a first schematic view of a first coupling part and an extension spring according to a first embodiment of the present invention.
Figure 1B:
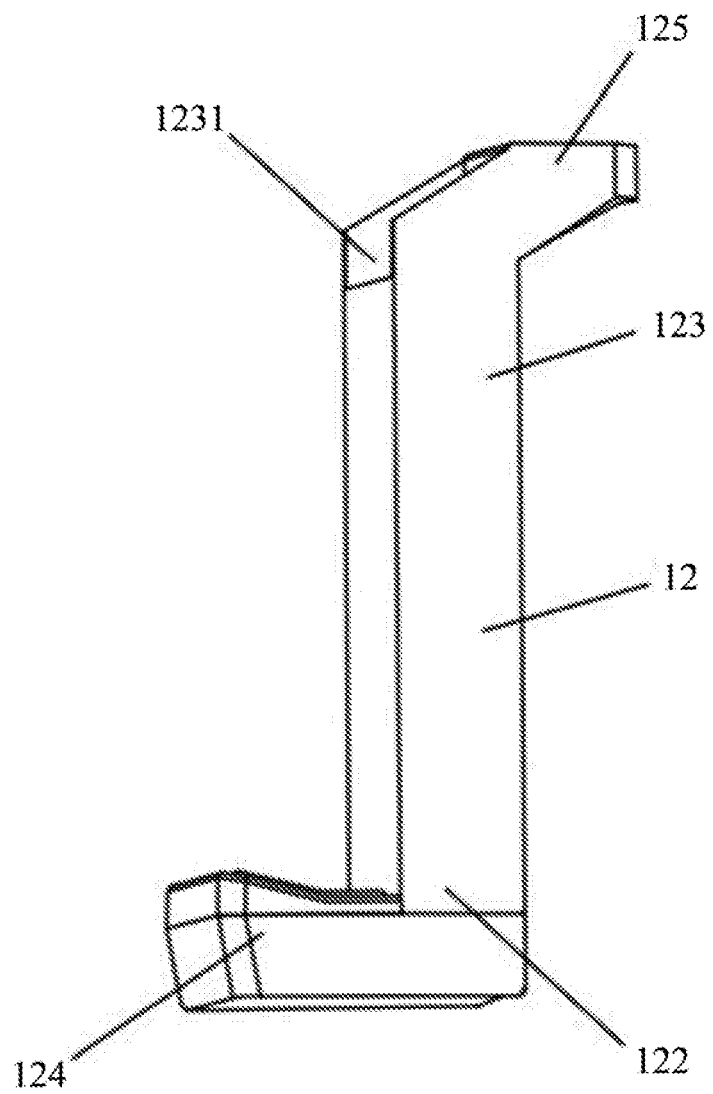
FIG. 1B is a first schematic view of a second coupling part according to the first embodiment of the present invention.
Figure 2A:
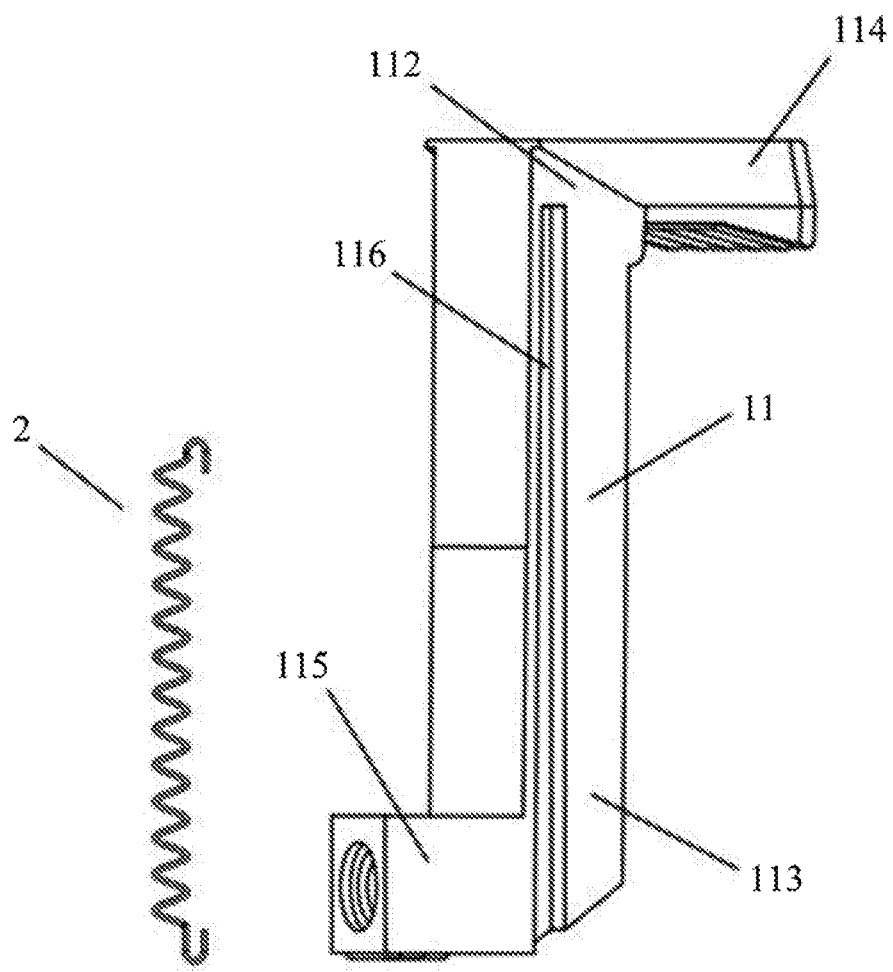
FIG. 2A is a second schematic view of the first coupling part and the extension spring according to the first embodiment of the present invention.
Figure 2B:
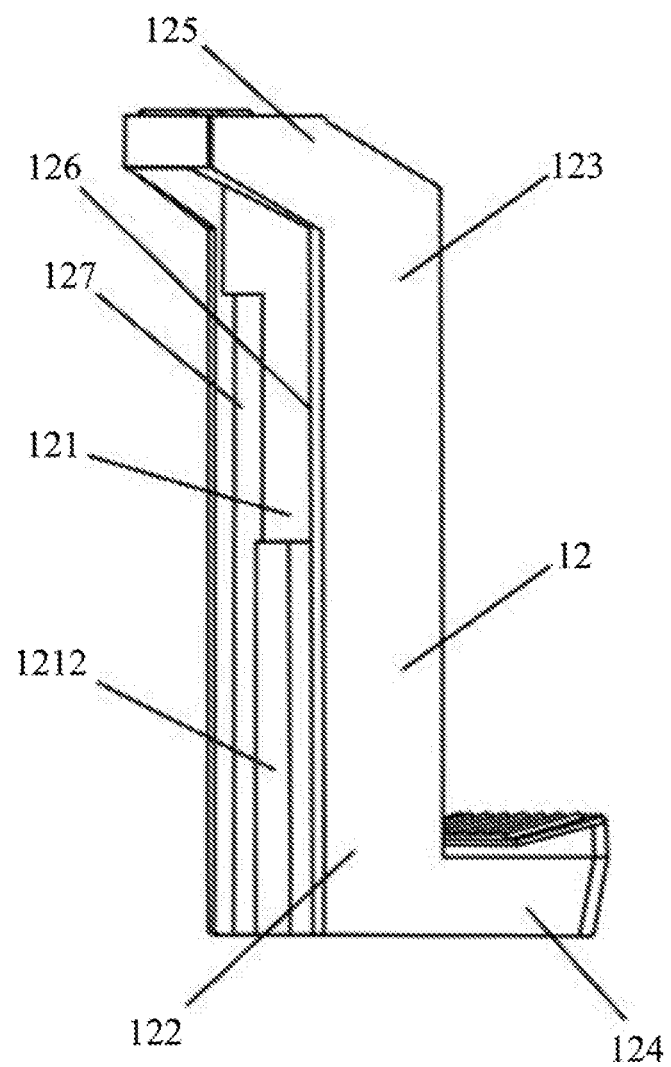
FIG. 2B is a second schematic view of the second coupling part according to the first embodiment of the present invention.
Figure 5A:
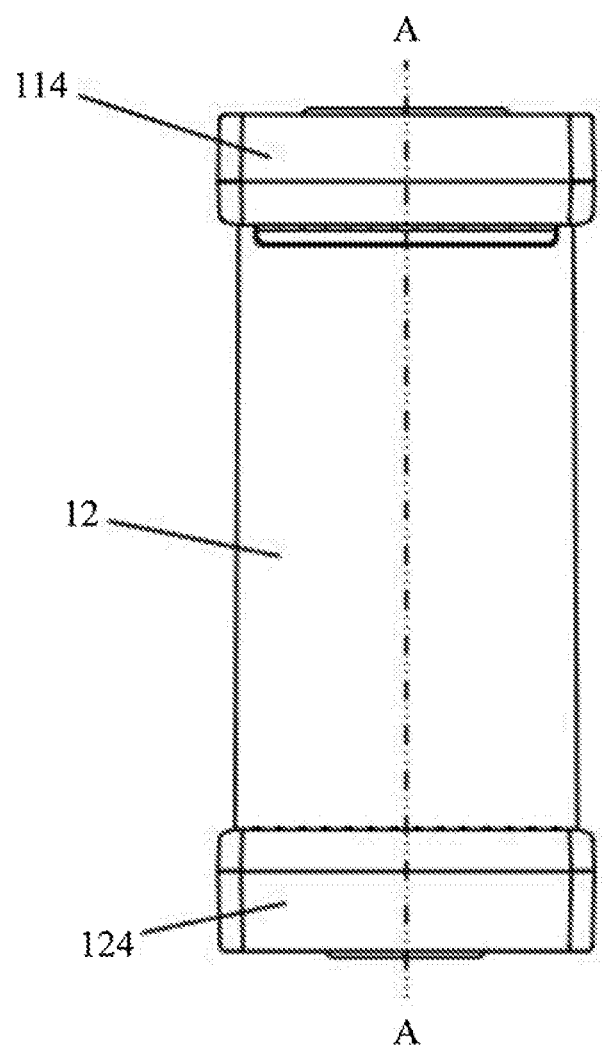
FIG. 5A is a schematic front view of the first embodiment of the present invention.
Figure 5B:
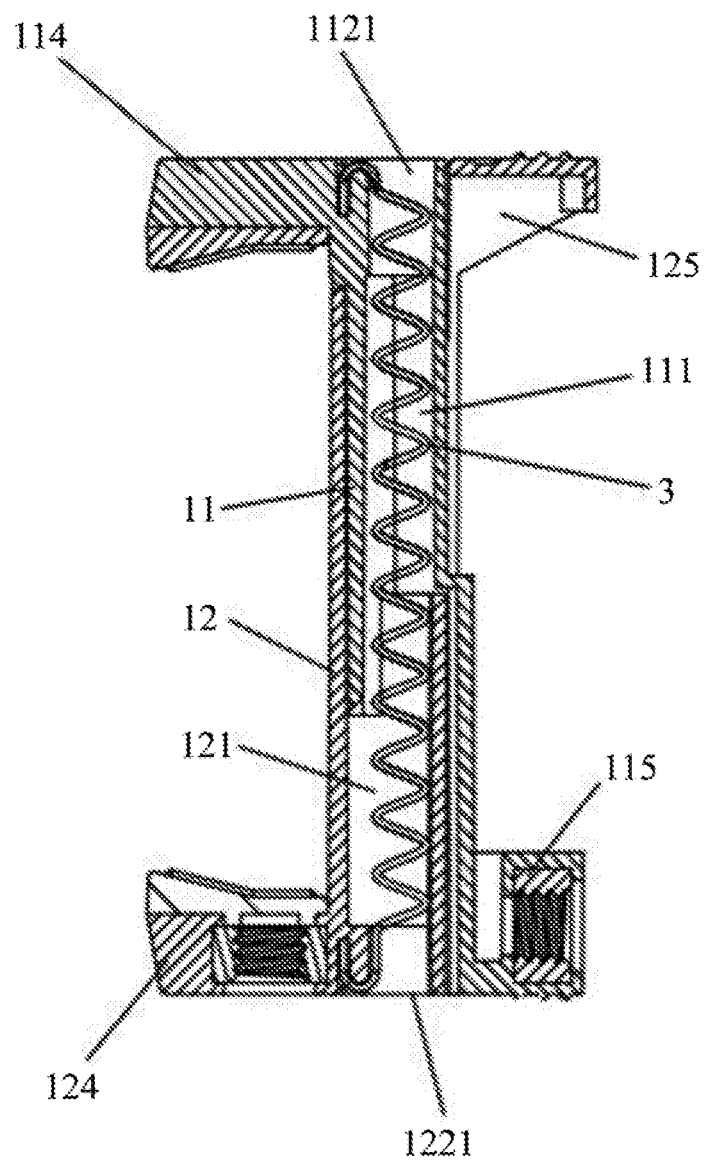
FIG. 5B is a schematic cross-section view of the first embodiment of the present invention taken along line A-A of FIG. 5A.
Figure 6A:
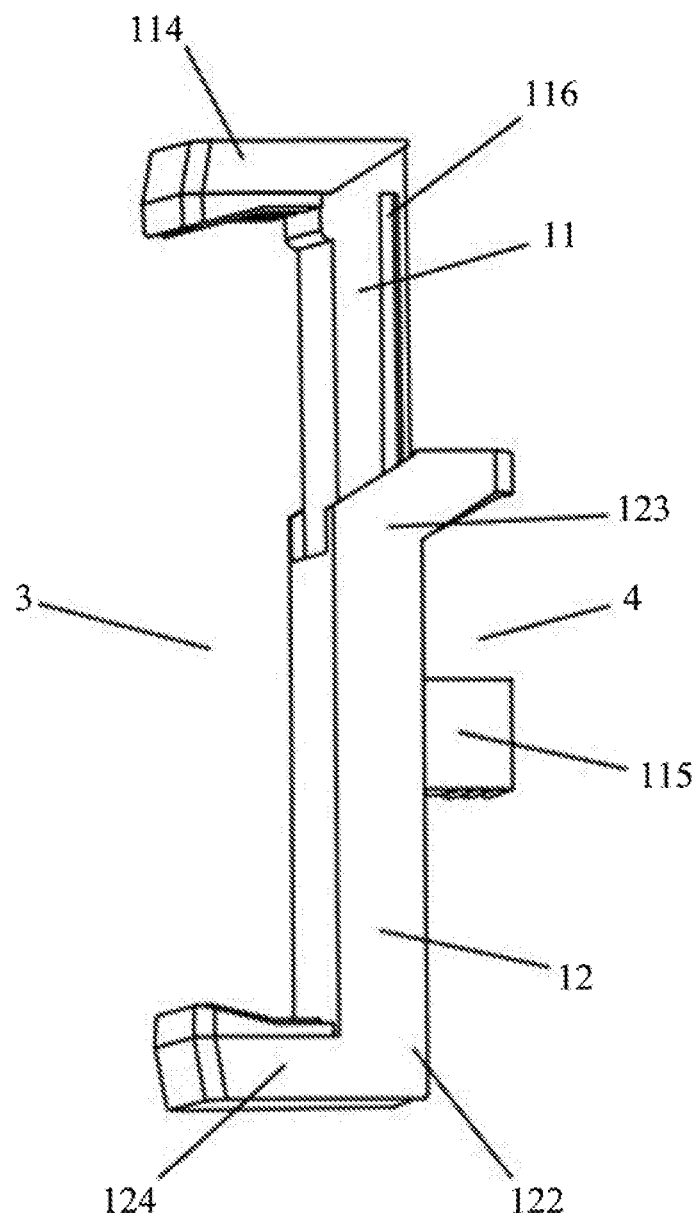
FIG. 6A is a first schematic view of the first embodiment of the present invention after pressed.
Figure 6B:
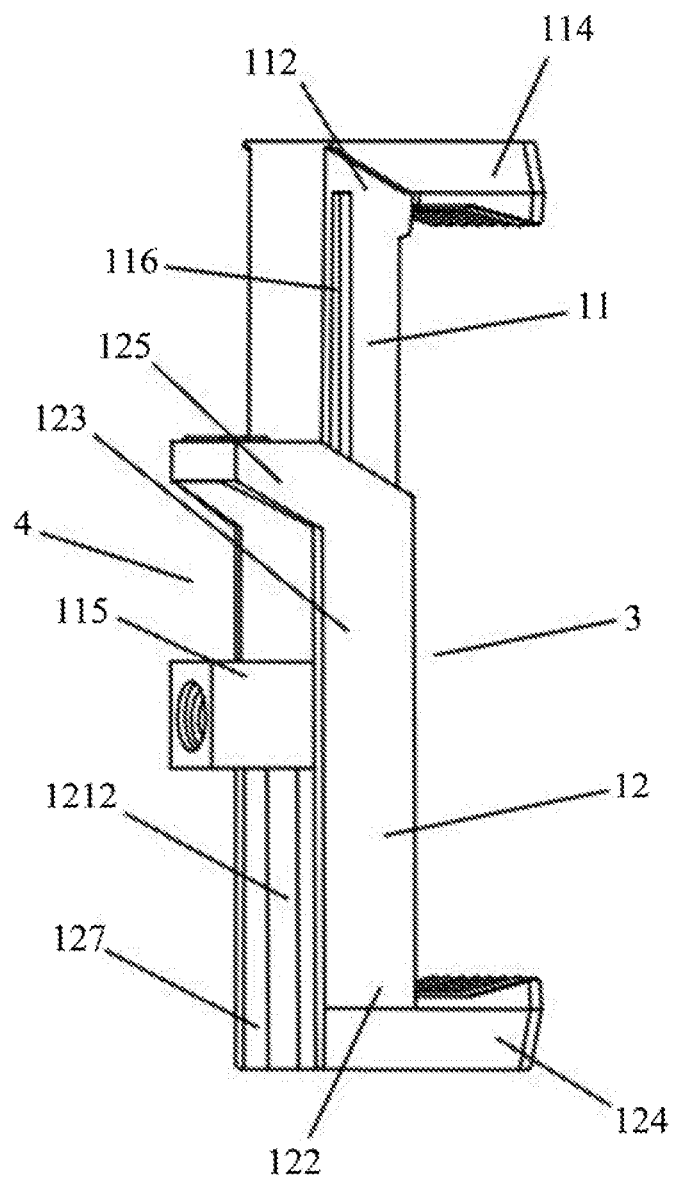
FIG. 6B is a second schematic view of the first embodiment of the present invention after pressed.
Figure 6C:
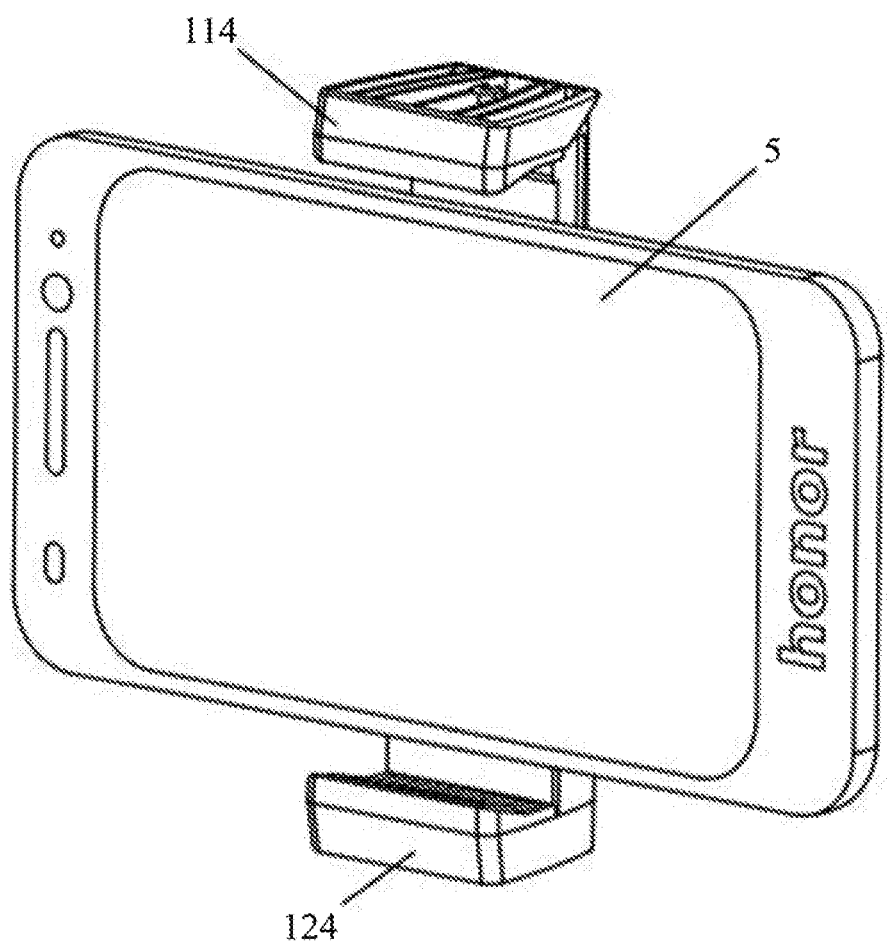
FIG. 6C is a first schematic view of the first embodiment of the present invention, wherein a mobile phone is placed therein.
Figure 6D:
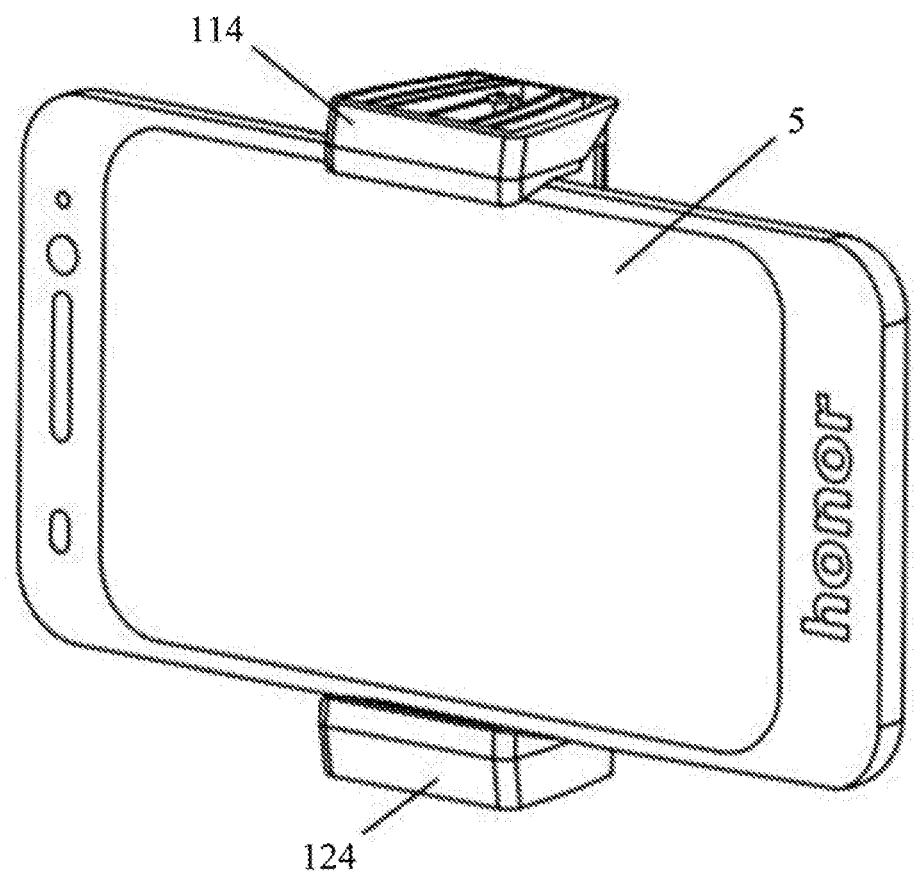
FIG. 6D is a second schematic view of the first embodiment of the present invention, wherein the mobile phone is placed therein.

As shown in FIGS. 1A to 6D, a mobile phone holder with a sliding opening according to the first embodiment of the present invention includes: a first coupling part 11, a second coupling part 12, and an extension spring 2. As shown in FIGS. 1A and 2A, both ends of the first coupling part 11 are a first acting end 112 and a first operating end 113, respectively. A first accommodating portion 111 is disposed in the first coupling part 11. The first accommodating portion 111 is provided with a first operating end opening 1131 at the first operating end 113. A first clamping portion 114 and a first pressing portion 115 are disposed on different outer sides of the first coupling part 11, respectively. The first clamping portion 114 is disposed at a predetermined position of the first acting end 112, and the first pressing portion 115 is disposed at a predetermined position of the first operating end 113. As shown in FIGS. 1B and 2B, both ends of the second coupling part 12 are a second acting end 122 and a second operating end 123, respectively. A second accommodating portion 121 is disposed in the second coupling part 12. The second accommodating portion 121 is provided with a second operating end opening 1231 at the second operating end 123. A second clamping portion 124 and a second pressing portion 125 are disposed on different outer sides of the second coupling part 12, respectively. The second clamping portion 124 is disposed at a predetermined position of the second acting end 122, and the second pressing portion 125 is disposed at a predetermined position of the second operating end 123. As shown in FIG. 2B, the second coupling part 12 is provided with a sliding opening 126, the sliding opening 126 is positioned at a same side as the second pressing portion 125 and communicated with the second accommodating portion 121. As shown in FIGS. 3A-3D, the first pressing portion 115 of the first operating end 113 penetrates into the second accommodating portion 121 through the second operating end opening 1231 and penetrates out of the second accommodating portion 121 through the sliding opening 126, such that the first clamping portion 114 and the second clamping portion 124 face toward a same direction and correspond to each other, and the first pressing portion 115 and the second pressing portion 125 face toward another same direction and correspond to each other. As shown in FIGS. 4A and 4B, a clamping space 3 is formed between the first clamping portion 114 and the second clamping portion 124, and a pressing space 4 is formed between the first pressing portion 115 and the second pressing portion 125. As shown in FIGS. 5A and 5B, both ends of the extension spring 2 are respectively fixed at predetermined positions of the first accommodating portion 111 and the second accommodating portion 121 such that a width of the clamping space 3 is minimum, and a width of the pressing space 4 is maximum. As shown in FIGS. 6A and 6B, the first pressing portion 115 and the second pressing portion 125 are pressed toward each other simultaneously, such that the first operating end 113 and the first pressing portion 115 of the first coupling part 11 slide at the second accommodating portion 121 and the sliding opening 126, respectively, thereby the width of the pressing space 4 decreases and the width of the clamping space 3 increases. As shown in FIG. 6C, a mobile phone 5 is placed into the clamping space 3. Then, as shown in FIG. 6D, the first pressing portion 115 and the second pressing portion 125 are released simultaneously, thereby due to a tensile force action of the extension spring 2, the width of the pressing space 4 increases and the width of the clamping space 3 correspondingly decreases such that the first clamping portion 114 and the second clamping portion 124 hold the mobile phone 5. The extension spring 2 according to the present invention may be other elements with elastic tension.

As shown in FIGS. 3A to 3D, a first fastener 1151 is disposed at a predetermined position on an outer side of the first pressing portion 115. The first fastener 1151 is used for being connected to a stand or fixed on other objects. The first fastener 1151 described in this embodiment has various implementations, such as screws or nuts.

As shown in FIGS. 3A to 3D, a second fastener 1241 is disposed at a predetermined position on an outer side of the second clamping portion 124. The second fastener 1241 is used for being connected to the stand or fixed on other objects. The second fastener 1241 described in this embodiment has various implementations, such as screws or nuts.

Figure 7A:
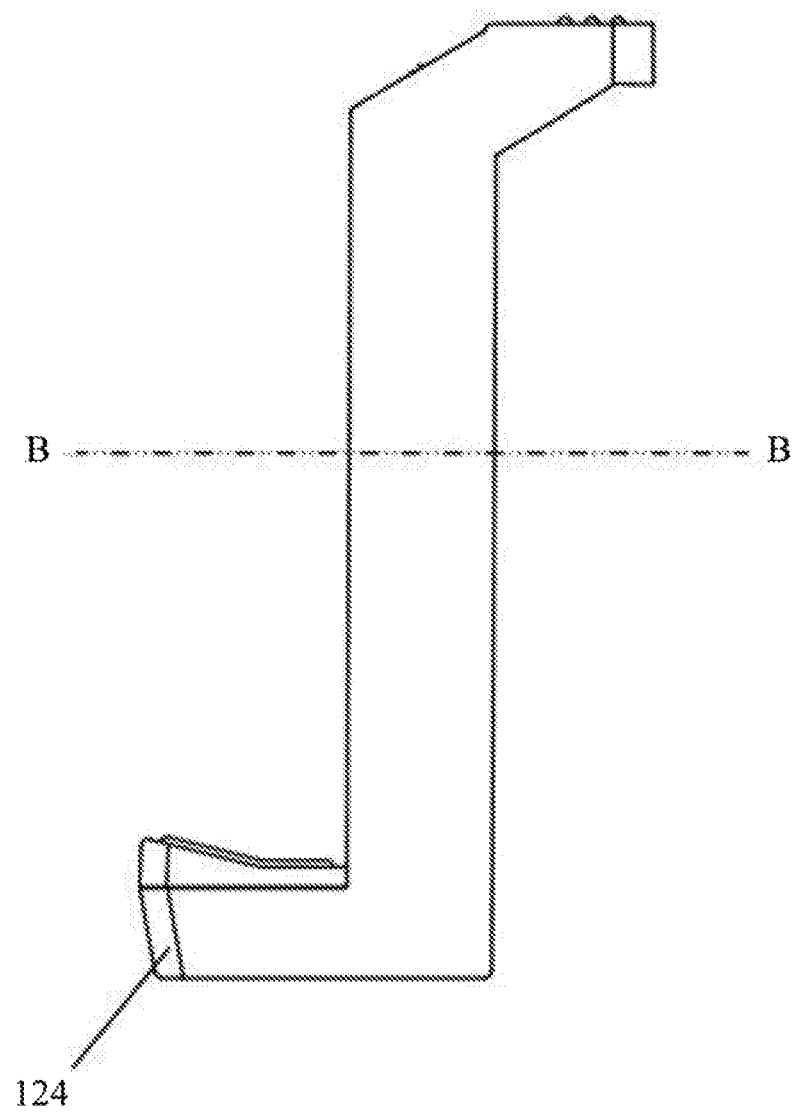
FIG. 7A is a schematic side view of the second coupling part according to the first embodiment of the present invention.
Figure 7B:
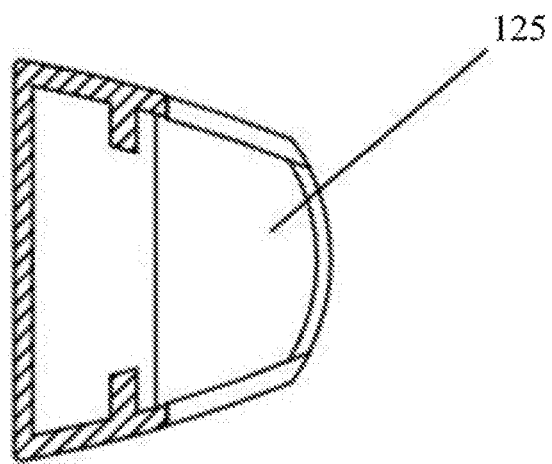
FIG. 7B is a schematic cross-section view taken along line B-B of FIG. 7A.

As shown in FIGS. 7A to 7B, which show a cross-sectional profile taken along the line B-B according to the first embodiment of the present invention, the cross-section of the first coupling part 11 and the second coupling part 12 is a trapezoid, which can increase the stability when the first coupling part 11 and the second coupling part 12 slide against each other. The trapezoid described in this embodiment may have other implementations. The cross-section of the first coupling part 11 and the second coupling part 12 described in this embodiment may be different shapes such as rectangular, capsule-shaped, semi-circular, double-sided concave, and other shapes.

Figure 3A:
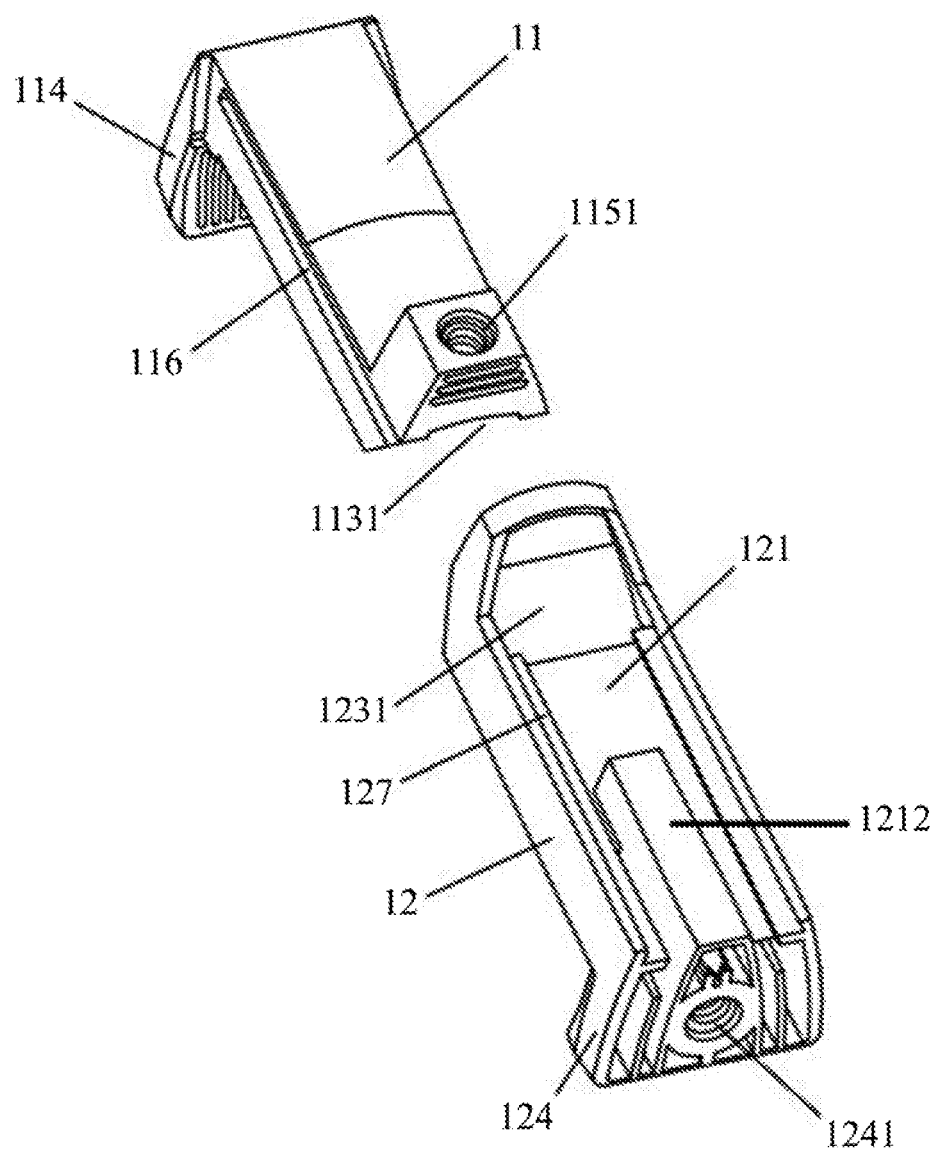
FIG. 3A is a schematic view of the first embodiment of the present invention before assembled.
Figure 3B:
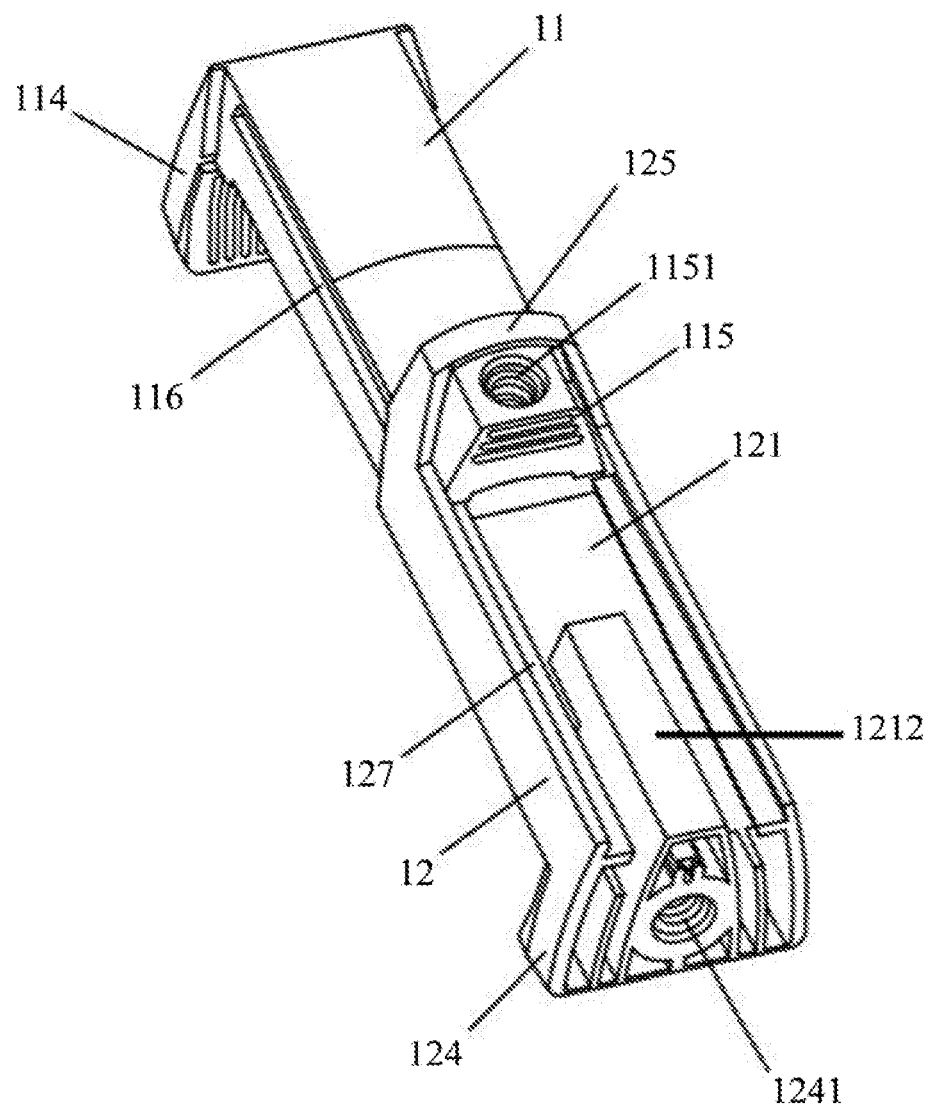
FIG. 3B is a schematic view of a first assembling step of the first embodiment of the present invention.
Figure 3C:
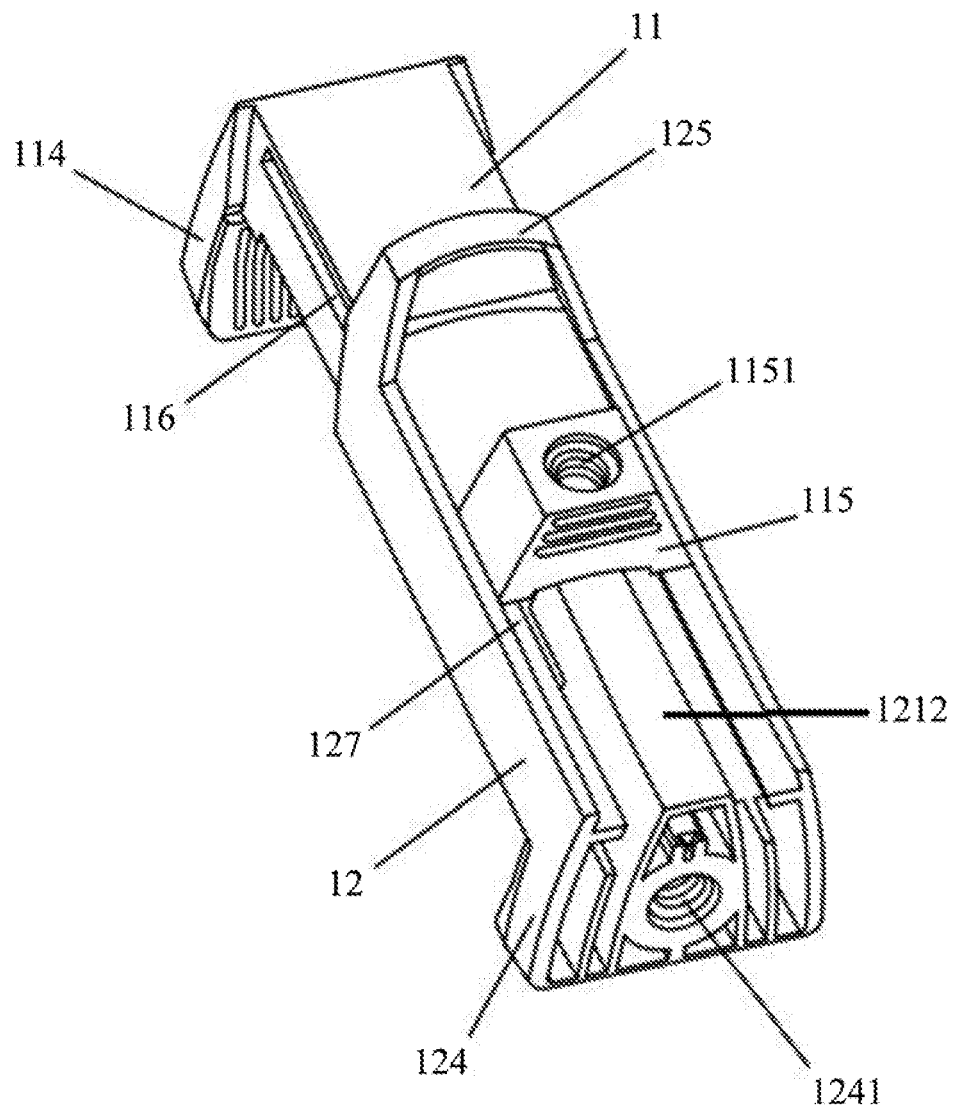
FIG. 3C is a schematic view of a second assembling step of the first embodiment of the present invention.

As shown in FIG. 3A, at least one longitudinal stabilizing groove 116 is disposed at a predetermined position outside the first coupling part 11, and at least one longitudinal stabilizing flange 127 is disposed in the second accommodating portion 121 at a position corresponding to the longitudinal stabilizing groove 116. As shown in FIGS. 3B and 3C, the first operating end 113 penetrates into the second accommodating portion 121 through the second operating end opening 1231 such that the longitudinal stabilizing groove 116 and the longitudinal stabilizing flange 127 are engaged with each other, thereby the longitudinal stabilizing flange 127 can longitudinally slide in the longitudinal stabilizing groove 116. This embodiment can increase the stability when the first coupling part 11 and the second coupling part 12 slide against each other.

Figure 8A:
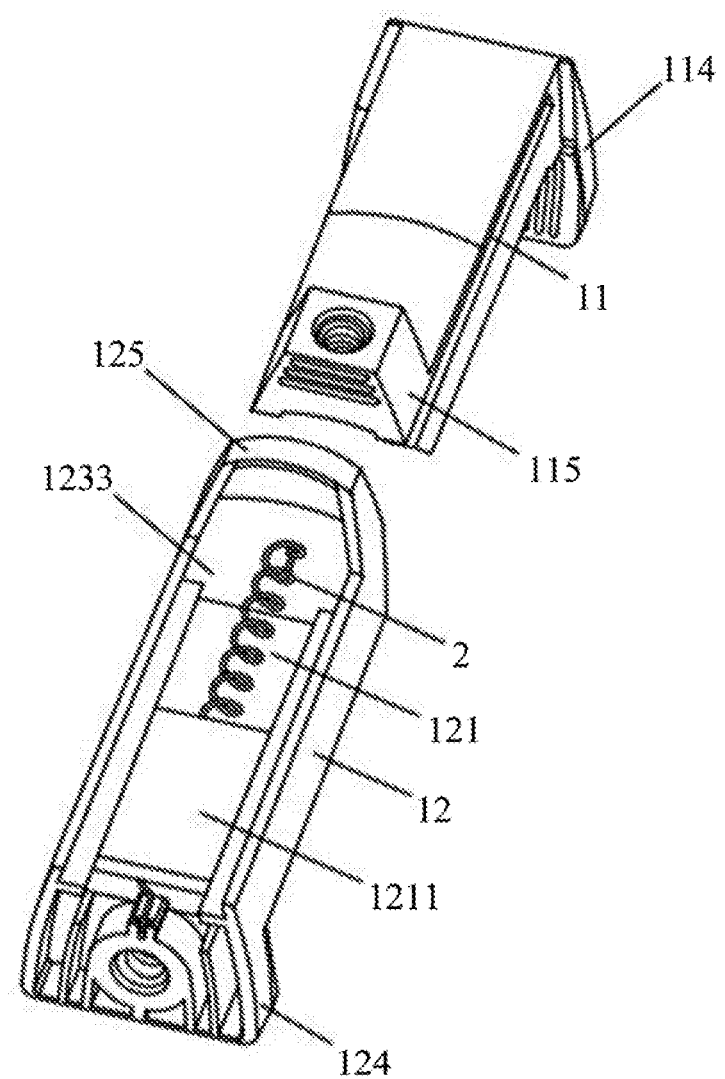
FIG. 8A is a schematic exploded view of the second embodiment of the present invention.
Figure 8B:
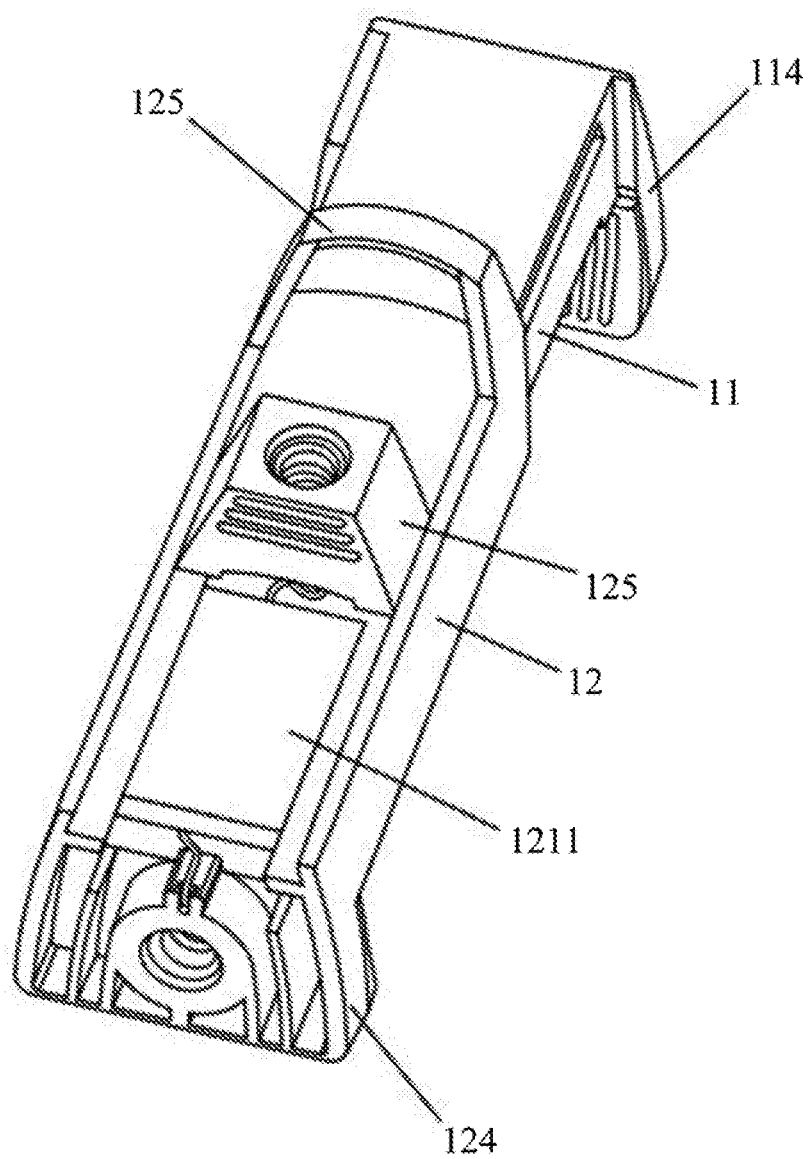
FIG. 8B is a schematic view of the second embodiment of the present invention during assembling.

As shown in FIG. 3A, a back U-groove 1212 is disposed at the second acting end 122 in the second accommodating portion 121, and the back U-groove 1212 is longitudinally disposed around the extension spring 2. After the first coupling part 11 and the second coupling part 12 are assembled, as shown in FIGS. 3B and 3C, when the pressing space 4 is reduced, the back U-groove 1212 can prevent the extension spring 2 from exposure. As shown in FIG. 1A, in this embodiment, on the plane on which the first clamping portion 114 of the first coupling part 11 is positioned, a notch 1132 corresponding to the back U-groove 1212 is provided from the first operating end opening 1131 toward the first acting end 112. The notch 1132 shortens a length of a closed section of the first accommodating portion 111, thereby increasing the production efficiency. The back U-groove 1212 of the present invention has other implementations. For example, as shown in FIG. 8A, a back plate 1211 is disposed at a position near the second acting end 122 in the second accommodating portion 121. After the first coupling part 11 and the second coupling part 12 are assembled, as shown in FIG. 8B, when the pressing space 4 is reduced, the back plate 1211 can prevent the extension spring 2 from exposure, thereby easily causing the operator's hand to be caught or affecting the appearance.

Figure 9A:
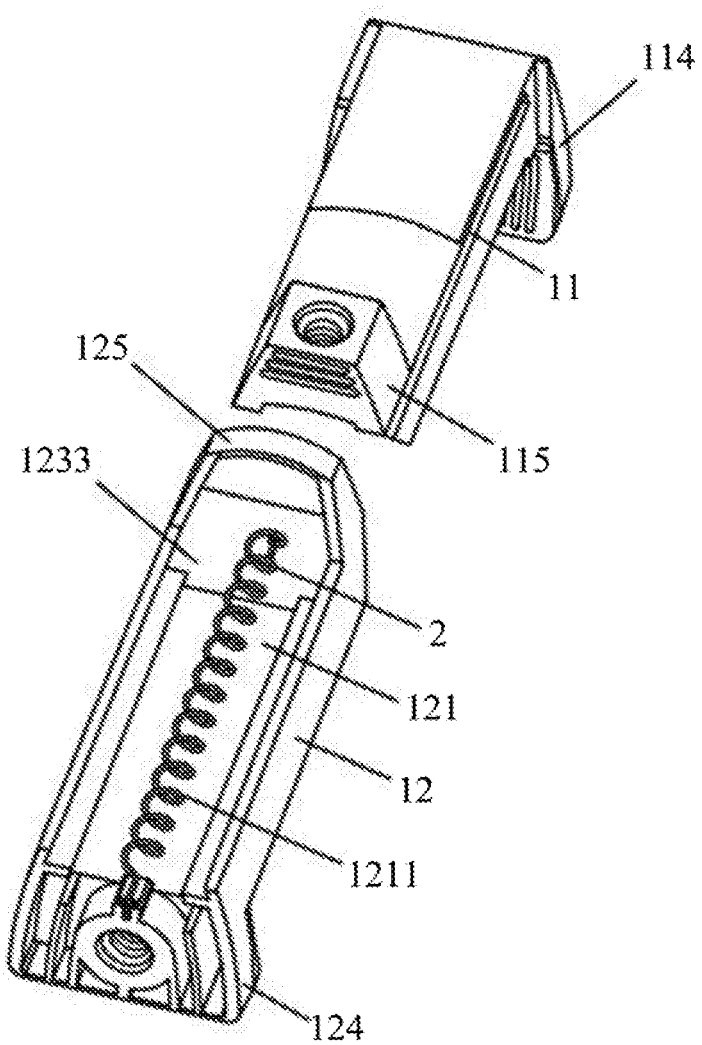
FIG. 9A is a schematic exploded view of a third embodiment of the present invention.
Figure 9B:
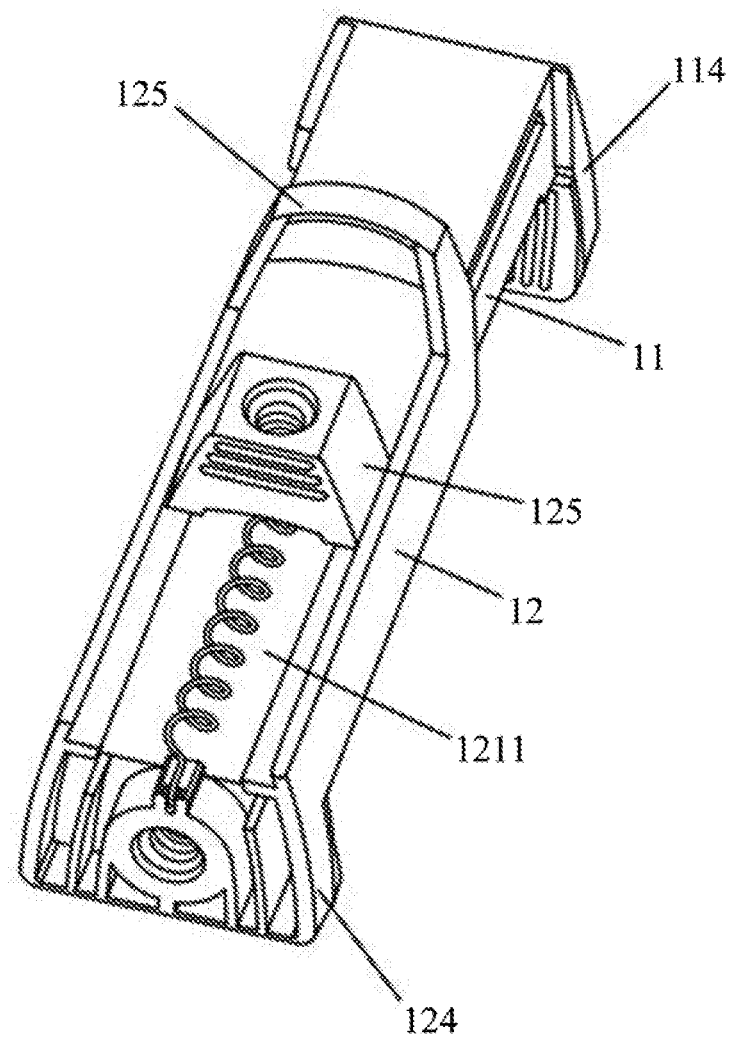
FIG. 9B is a schematic view of the third embodiment of the present invention during assembling.

As shown in FIG. 9A, if the back U-groove 1212 or the back plate 1211 is not disposed at the position of the second accommodating portion 121 near the second acting end 122, the extension spring 2 will expose when the first pressing portion 115 and the second pressing portion 125 are pressed toward each other simultaneously.

Figure 3D:
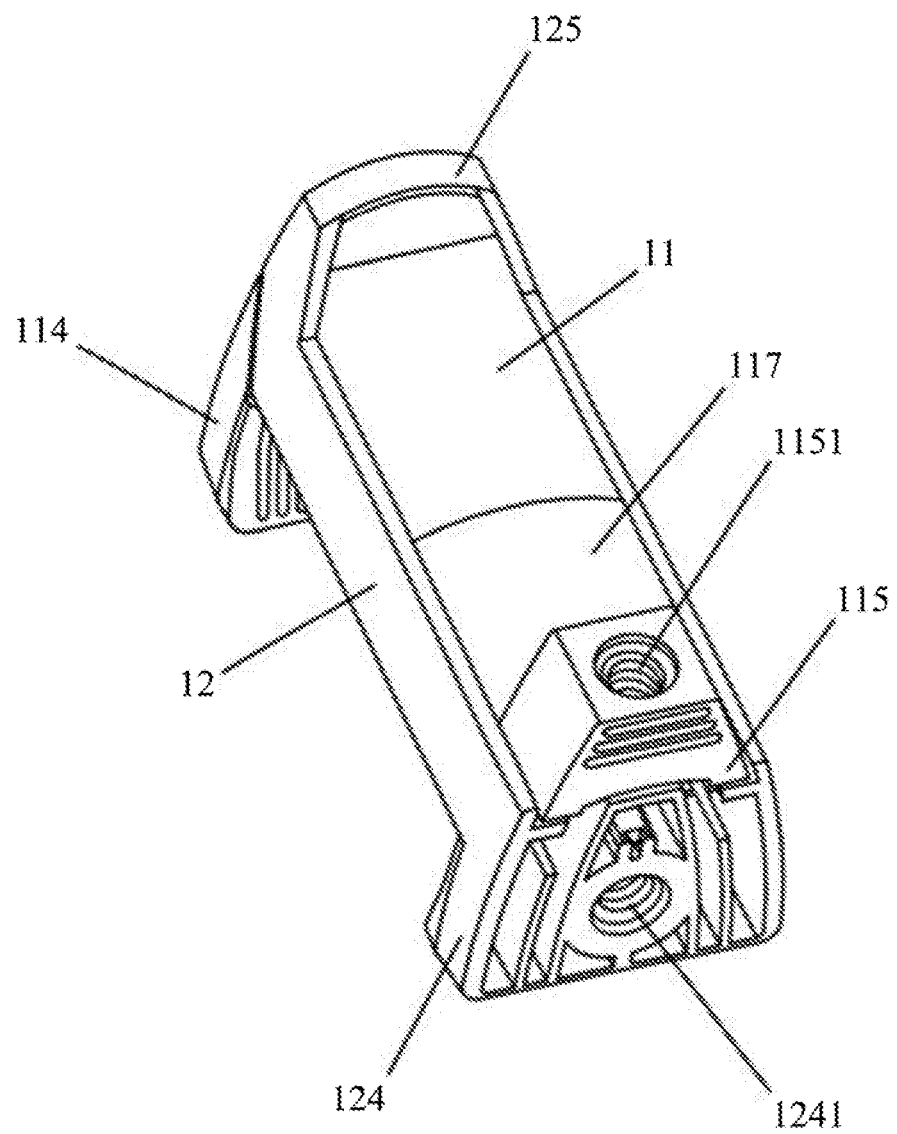
FIG. 3D is a schematic view of the first embodiment of the present invention after assembled.
Figure 4A:
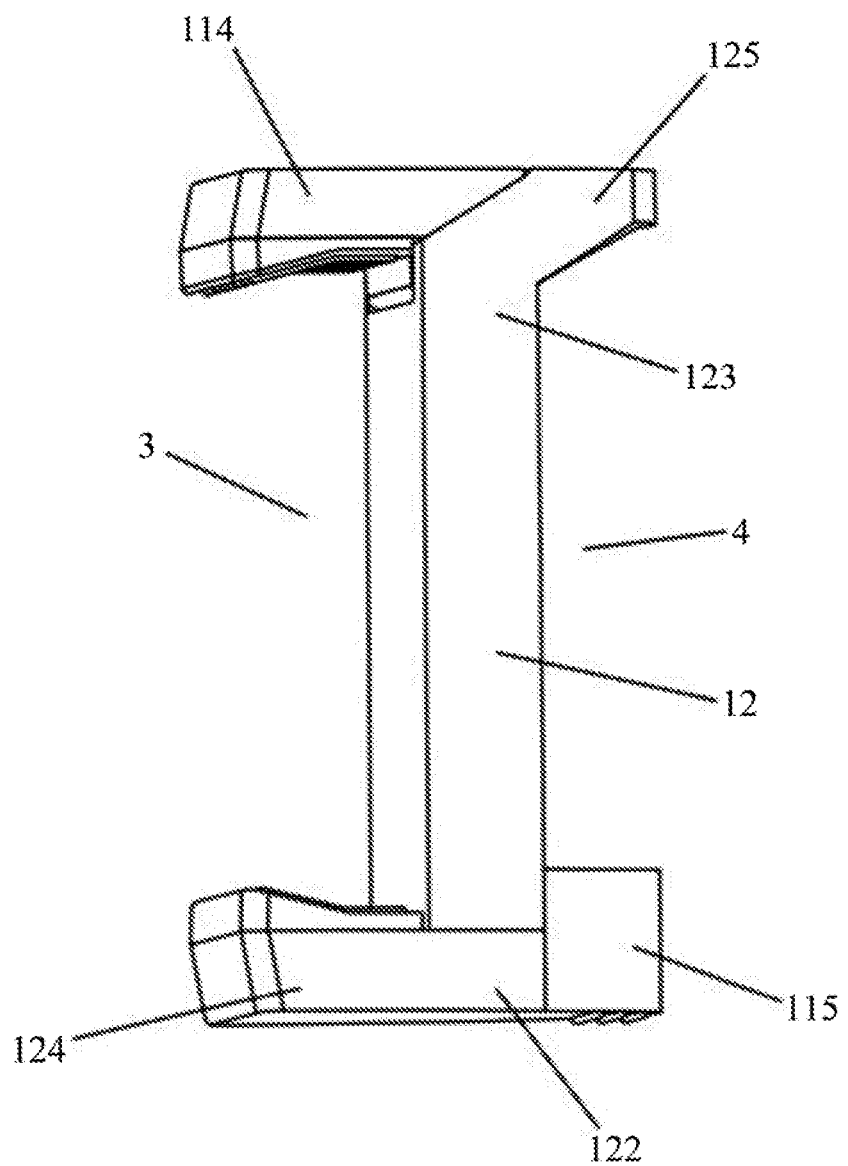
FIG. 4A is a first schematic view of the first embodiment of the present invention before pressed.
Figure 4B:
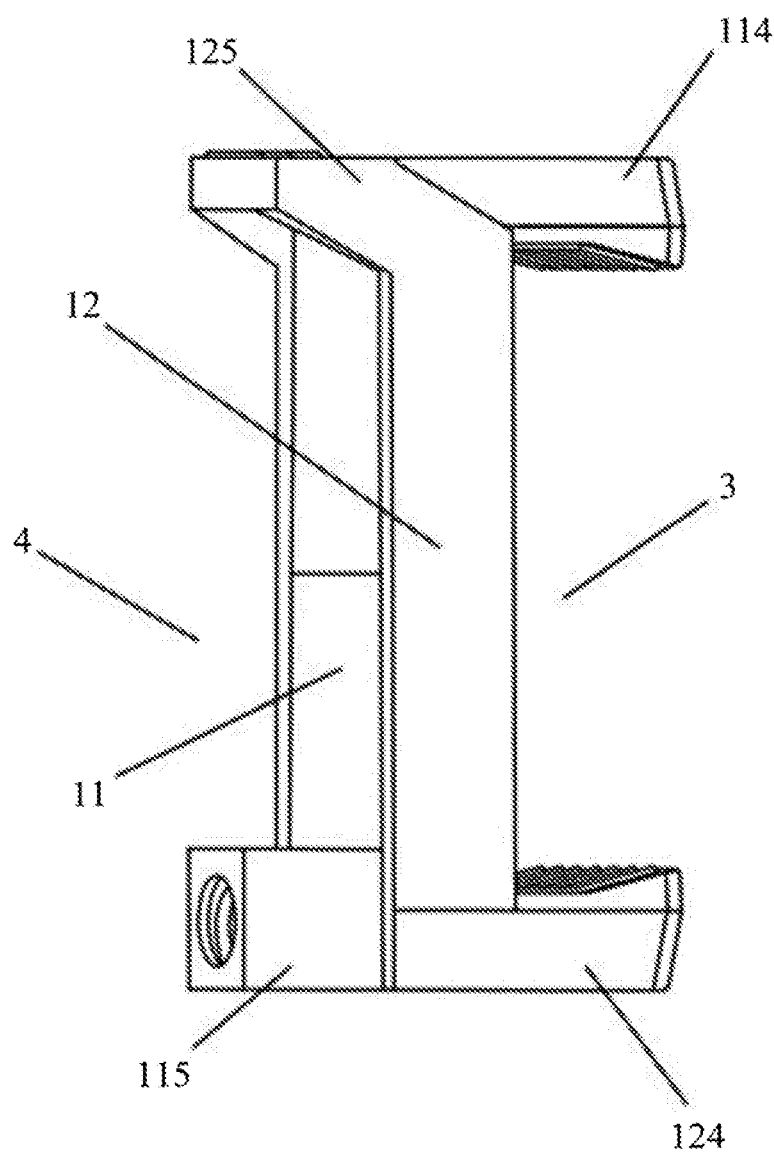
FIG. 4B is a second schematic view of the first embodiment of the present invention before pressed.
Figure 10:
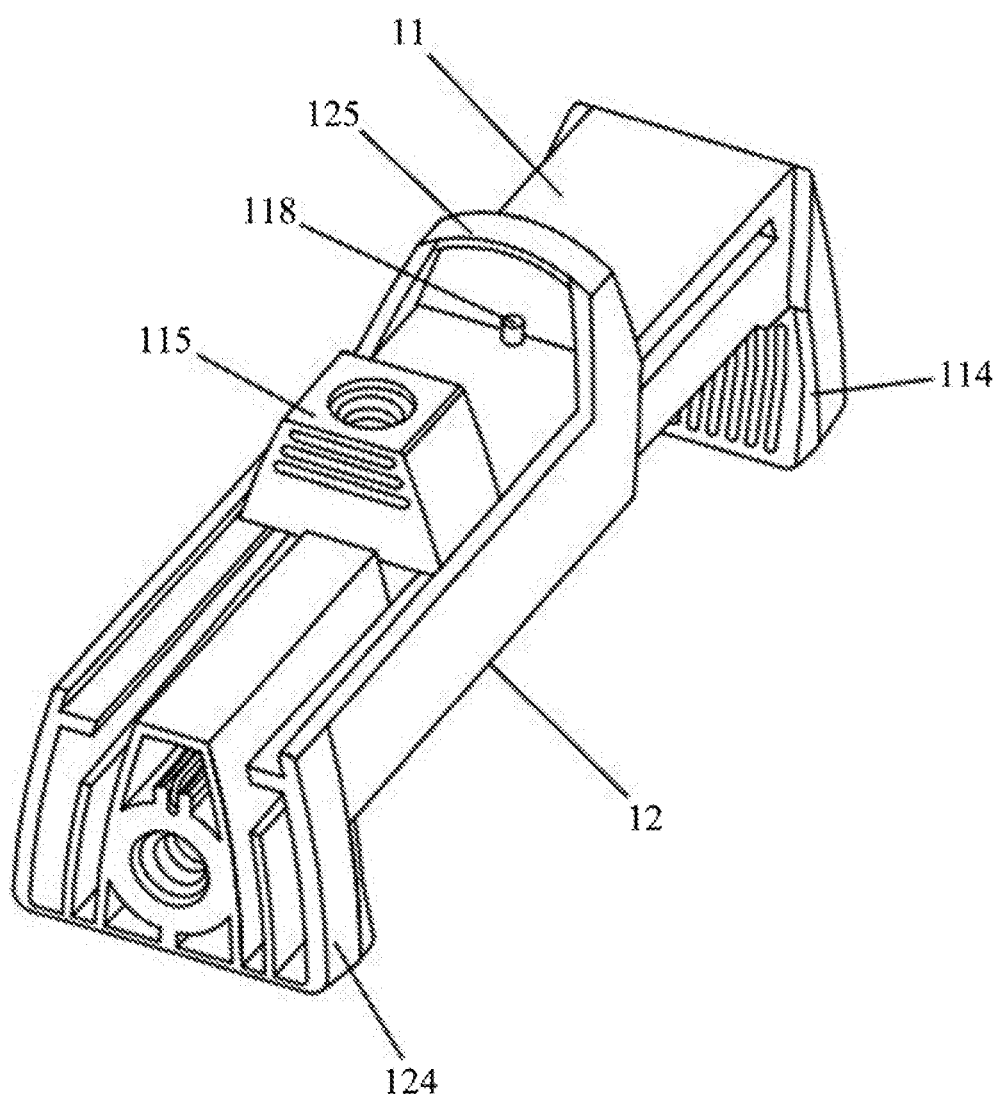
FIG. 10 is a schematic view of a fourth embodiment of the present invention.

As shown in FIGS. 3A and 3D, a protruding plane 117 is disposed at a predetermined position near the first operating end 113 on a plane where the first pressing portion 115 of the first coupling part 11 is positioned. After the first coupling part 11 and the second coupling part 12 are assembled, as shown in FIG. 3C, when the first pressing portion 115 and the second pressing portion 125 are pressed toward each other simultaneously, the protruding plane 117 can abut against the second pressing portion 125 to avoid the first coupling part 11 and the second coupling part 12 from being separated from each other. The protruding plane 117 described in this embodiment may have other implementations. For example, as shown in FIG. 10, at least one protruding point 118 is disposed at a predetermined position near the first operating end 113 on a plane where the first pressing portion 115 of the first coupling part 11 is positioned. The protruding point 118 can abut against the second pressing portion 125, which provides the same function as the protruding plane 117.

As shown in FIG. 5B, the first accommodating portion 111 is provided with a first acting end opening 1121 at the first acting end 112, and the second accommodating portion 121 is provided with a second acting end opening 1221 at the second acting end 122. Therefore, it is more convenient when assembling the extension spring 2 due to the arrangement of the first acting end opening 1121 and the second acting end opening 1221.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A mobile phone holder with a sliding opening for holding a mobile phone, comprising:
   a first coupling part, wherein both ends of the first coupling part are a first acting end and a first operating end, respectively; a first accommodating portion is disposed in the first coupling part; the first accommodating portion is provided with a first operating end opening at the first operating end; a first clamping portion and a first pressing portion are disposed on different outer sides of the first coupling part, respectively; the first clamping portion is disposed at a predetermined position of the first acting end, and the first pressing portion is disposed at a predetermined position of the first operating end;
   a second coupling part, wherein both ends of the second coupling part are a second acting end and a second operating end, respectively; a second accommodating portion is disposed in the second coupling part; the second accommodating portion is provided with a second operating end opening at the second operating end; a second clamping portion and a second pressing portion are disposed on different outer sides of the second coupling part, respectively; the second clamping portion is disposed at a predetermined position of the second acting end, and the second pressing portion is disposed at a predetermined position of the second operating end, wherein the second coupling part is provided with a sliding opening, the sliding opening is positioned at a same side as the second pressing portion and communicated with the second accommodating portion; and
   an extension spring;
   wherein the first pressing portion of the first operating end penetrates into the second accommodating portion through the second operating end opening and penetrates out of the second accommodating portion through the sliding opening, such that the first clamping portion and the second clamping portion face toward a same direction and correspond to each other, and the first pressing portion and the second pressing portion face toward another same direction and correspond to each other, thereby a clamping space is formed between the first clamping portion and the second clamping portion, and a pressing space is formed between the first pressing portion and the second pressing portion; both ends of the extension spring are respectively fixed at predetermined positions of the first accommodating portion and the second accommodating portion such that a width of the clamping space is minimum, and a width of the pressing space is maximum; the first pressing portion and the second pressing portion are pressed toward each other simultaneously such that the first operating end and the first pressing portion of the first coupling part slide at the second accommodating portion and the sliding opening, respectively, thereby the width of the pressing space decreases and the width of the clamping space increases; a mobile phone is placed into the clamping space, then the first pressing portion and the second pressing portion are released simultaneously, thereby due to a tensile force action of the extension spring, the width of the pressing space increases and the width of the clamping space correspondingly decreases such that the first clamping portion and the second clamping portion hold the mobile phone.

2. The mobile phone holder according to claim 1, wherein a first fastener is disposed at a predetermined position on an outer side of the first pressing portion.

3. The mobile phone holder according to claim 1, wherein a second fastener is disposed at a predetermined position on an outer side of the second clamping portion.

4. The mobile phone holder according to claim 1, wherein at least one longitudinal stabilizing groove is disposed at a predetermined position outside the first coupling part, and at least one longitudinal stabilizing flange is disposed in the second accommodating portion at a position corresponding to the longitudinal stabilizing groove; the first operating end penetrates into the second accommodating portion through the second operating end opening such that the longitudinal stabilizing groove and the longitudinal stabilizing flange are engaged with each other, thereby the longitudinal stabilizing flange is longitudinally slidable in the longitudinal stabilizing groove.

5. The mobile phone holder according to claim 1, wherein a back U-groove is disposed at the second acting end in the second accommodating portion, and the back U-groove is longitudinally disposed around the extension spring.

6. The mobile phone holder according to claim 1, wherein a protruding plane is disposed at a predetermined position near the first operating end on a plane where the first pressing portion of the first coupling part is positioned.

* * * * *